United States Patent
Okubo et al.

(10) Patent No.: US 7,438,046 B2
(45) Date of Patent: Oct. 21, 2008

(54) FAILURE DETECTION APPARATUS FOR VARIABLE VALVE TIMING AND LIFT CONTROL SYSTEM OF INTERNAL COMBUSTION ENGINE

(75) Inventors: Katsura Okubo, Saitama (JP); Yuji Yasui, Saitama (JP); Masahiro Sato, Saitama (JP); Koichiro Shinozaki, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 0 days.

(21) Appl. No.: 11/642,944

(22) Filed: Dec. 21, 2006

(65) Prior Publication Data

US 2007/0239343 A1    Oct. 11, 2007

(30) Foreign Application Priority Data

Dec. 29, 2005 (JP) ............................. 2005-380546

(51) Int. Cl.
*F02D 13/04* (2006.01)
*F01L 1/00* (2006.01)

(52) U.S. Cl. ..................... 123/321; 123/345; 123/90.1

(58) Field of Classification Search ................ 701/101, 701/111; 123/321, 322, 345–348, 90.1, 90.15
See application file for complete search history.

(56) References Cited

U.S. PATENT DOCUMENTS

| | | | |
|---|---|---|---|
| 4,957,074 A | 9/1990 | Weissler, II et al. | |
| 5,505,176 A * | 4/1996 | Ishii et al. ................ | 123/406.4 |
| 5,797,360 A | 8/1998 | Pischinger et al. | |
| 6,581,557 B1 | 6/2003 | Gaessler et al. | |
| 6,840,235 B2 * | 1/2005 | Koseki et al. .......... | 123/568.14 |
| 2005/0166895 A1 | 8/2005 | Yoshizawa et al. | |

FOREIGN PATENT DOCUMENTS

| | | |
|---|---|---|
| DE | 196 23 698 A1 | 12/1997 |
| DE | 199 63 753 A1 | 7/2001 |
| DE | 10 2004 010 903 B3 | 9/2005 |
| DE | 10 2005 004 805 A1 | 9/2005 |
| EP | 1 467 068 A1 | 10/2004 |
| GB | 2 154 657 A | 9/1985 |
| JP | 07-238822 A | 9/1995 |
| JP | 2943042 A | 6/1999 |
| JP | 2001-254637 A | 9/2001 |
| JP | 2002-147260 A | 5/2002 |

* cited by examiner

*Primary Examiner*—John T Kwon
(74) *Attorney, Agent, or Firm*—Arent Fox LLP

(57) ABSTRACT

A failure detection apparatus for preventing erroneous detection due to a degradation of a sensor and thereby accurately performing failure detection of a variable valve timing and lift control system is provided. The detection apparatus detects a failure of a variable valve timing and lift control system in an engine. The detection apparatus detects a vibration inside an engine cylinder, extracts the component of seating sound of the valve from the output signal of the sensor, determines an actual seating time of said valve from the component of seating sound, and calculates a target seating time of said valve based on at least one of a requested lift amount, a requested advance angle, and a requested open angle depending on the operating conditions. The detecting apparatus corrects the actual seating time for a stationary deviation between the actual seating time and the target seating time caused by degradation or unevenness of the sensor. The detecting apparatus determines a failure of the variable valve timing and lift control system by comparing the corrected actual seating time with the target seating time.

16 Claims, 9 Drawing Sheets

FAILURE DETECTION APPARATUS FOR VARIABLE VALVE TIMING AND LIFT CONTROL SYSTEM OF INTERNAL COMBUSTION ENGINE

BACKGROUND OF THE INVENTION

1. Field of the Invention

The present invention relates to failure detection for a variable valve timing and lift control system of an internal combustion engine.

2. Description of the Related Art

To achieve improvements in power output and fuel economy (gas mileage), reduction in exhaust emissions, increase in torque at low revolutions, and higher output power at high-revolution/high-load operation of an internal combustion engine, a variable valve timing and lift control system is known which changes the open/close timing and/or the lift amount of the intake/exhaust valve.

Japanese Patent No. 2943042 discloses a technique for performing failure detection of such a variable valve timing and lift control system. In this technique, frequency components associated with seating sound of the valve are extracted from an output of a vibration sensor that detects the vibration of an internal combustion engine for detecting failure of the variable valve timing and lift control system. In this technique, a pulses A and B are generated, pulse A being high level at nearly the valve close time of a high speed cam of the variable valve timing and lift control system and pulse B being high at nearly the valve close time of a low speed cam. Components of the seating sound of the valve are extracted when these pulses are at high level. By comparing intensities of these components of seating sound, the cam with a higher intensity is assumed to be the cam being controlled. Then, the variable valve timing and lift control system is diagnosed by comparing the assumed cam with the cam being actually controlled.

SUMMARY OF THE INVENTION

However, the technique according to the Japanese Patent No. 2943042 tends to cause erroneous detection due to stationary deviations of the seating time caused by individual differences such as initial failure and degradation over time of the sensor for detecting seating sound. If, in consideration of such stationary deviations, the high-level state of the pulses A and B is extended, the sensing accuracy will decline due to the effect of noise, making accurate failure detection difficult to perform.

Further, it is difficult to apply the technique of the Japanese Patent No. 2943042 to a continuously variable valve timing and lift control system which is capable of continuously changing the open/close timing or the lift amount of the valve. As the seating time of the valve continuously changes in the continuously variable valve timing and lift control system, if the high-level state of the pulse is extended in consideration of degradation and unevenness, seating sounds of different operational property may be detected for the same pulse, making accurate failure detection difficult to perform.

Accordingly, it is an object of the present invention to provide a failure detection apparatus which is capable of preventing erroneous detection due to degradation of a sensor, thereby achieving accurate failure detection of a variable valve timing and lift control system.

The present invention provides an apparatus for detecting failure of a variable valve timing and lift control system in an internal combustion engine wherein the variable valve timing and lift control system is adapted to switch the opening/closing timing or the lift amount of the valve depending on operating conditions. This failure detection apparatus comprises a sensor for sensing vibration in a cylinder, means for extracting a component of seating sound of the valve from the output signal of the detection means, means for determining an actual seating time of the valve from the component of seating sound, means for calculating a target seating time based on at least one of requested lift amount, requested advance angle, or requested open angle which are determined according to operating conditions, means for correcting the actual seating time according to stationary deviation between the actual seating time and the target seating time caused by degradation or unevenness of the sensor, and means for comparing the corrected actual seating time and the target seating time to determine a failure of the variable valve timing and lift control system.

According to the present invention, erroneous detections due to degradations or unevenness of the sensor may be prevented, thereby achieving accurate failure detection of a variable valve timing and lift control system.

According to one embodiment of the present invention, the variable valve timing and lift control system comprises a variable valve lift control system capable of continuously changing the lift amount, or a variable valve phase control system capable of continuously changing the advance angle. By this configuration, erroneous detections due to degradations or unevenness of the detection means may be prevented even in a continuously variable valve timing and lift control system in which the seating time continuously changes.

According to a further embodiment of the present invention, the variable valve timing and lift control system is an electromagnetic valve capable of continuously changing the advance angle and the open angle thereof.

According to a further embodiment of the present invention, the detection means is an internal pressure sensor provided in each cylinder. Further, according to a further embodiment of the present invention, the output signal of the internal pressure sensor is a differential value of the internal pressure.

According to a further embodiment of the present invention, a failure detection apparatus for a variable valve timing and lift control system further comprises means for calculating a predicted seating time from the detection signal of an operating angle sensor placed in the variable valve timing and lift control system. In this case, the correction means further corrects the predicted seating time in response to a stationary deviation between the predicted seating time and the target seating time. The failure determination means further compares the corrected predicted seating time with the target seating time to determine a failure of the variable valve timing and lift control system.

According to a further embodiment of the present invention, the failure detection apparatus of a variable valve timing and lift control system further comprises means for filtering the deviation between the corrected actual seating time or the predicted seating time and the above described target seating time to remove high frequencies. In this case, the failure detection means determines a failure of the variable valve timing and lift control system based on this deviation.

According to a further embodiment of the present invention, the failure detection means determines a failure of the variable valve timing and lift control system when a state in which the deviation between the corrected, actual seating time or predicted seating time and the target seating time exceeds a predetermined value lasts for a predetermined period of time.

DETAILED DESCRIPTION OF THE PREFERRED EMBODIMENTS

Figure 1:
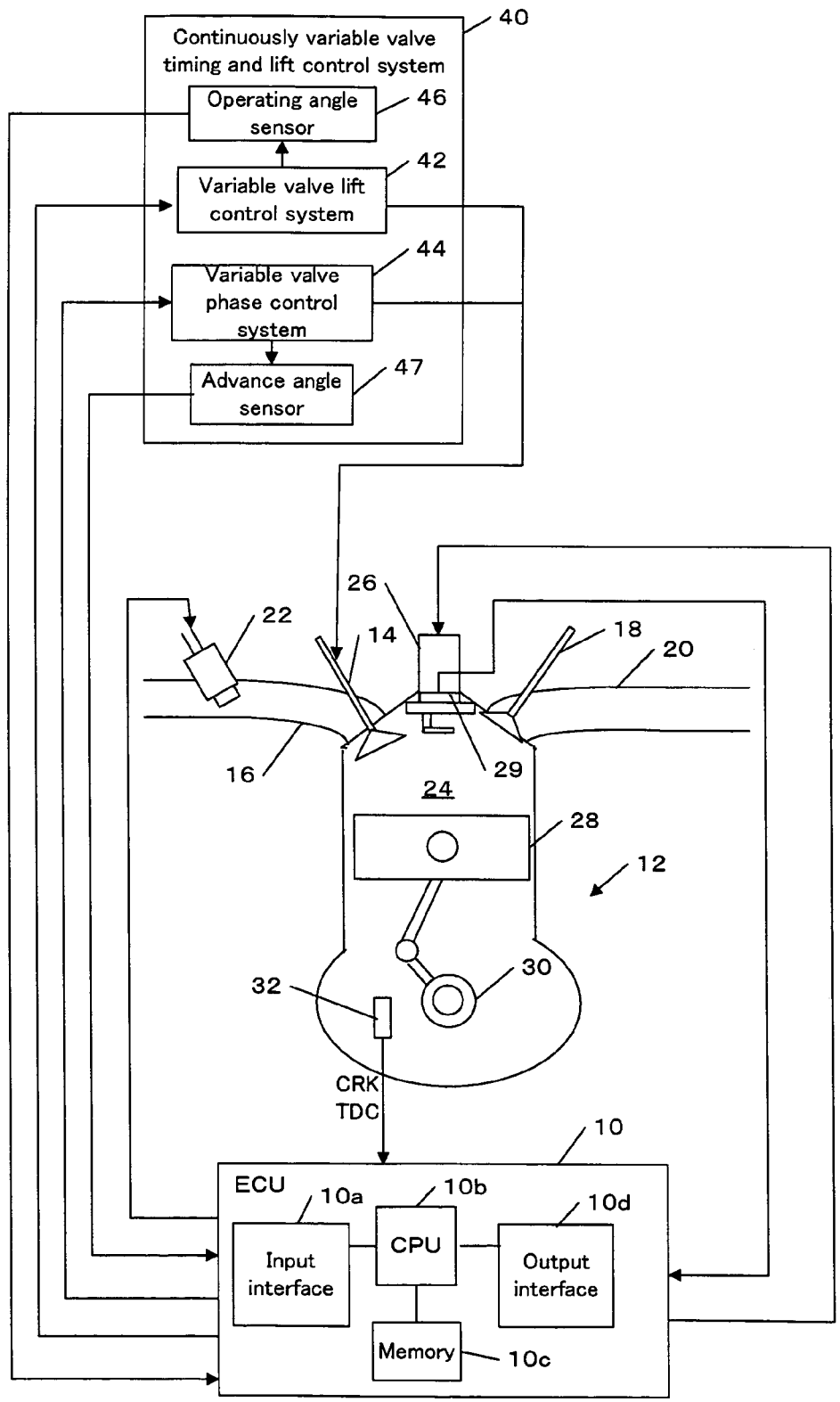
FIG. 1 illustrates a general configuration of an internal combustion engine and its control apparatus according to one embodiment of the present invention.

Next, embodiments of the present invention will be described with reference to drawings. FIG. 1 illustrates a general configuration of an internal combustion engine (hereinafter referred to as an engine) and its control apparatus, according to one embodiment of the present invention.

An electronic control unit (hereinafter referred to as an "ECU") 10 is a computer comprising an input interface 10a for receiving data sent from respective parts of the vehicle, a CPU 10b for performing calculation to control the respective parts of the vehicle, a memory 10c having a read only memory (ROM) and a random access memory (RAM) for tempory storage, and an output interface 10d for sending a control signal to the respective parts of the vehicle. In the ROM of the memory 10c, programs for controlling respective parts of the vehicle and various types of data are stored.

The program for the failure detection of a continuously variable valve timing and lift control system according to the present invention and the data and table used in performing the program are stored in the ROM of the memory 10c. This ROM may be a rewritable ROM such as an EEPROM. The RAM is provided with a working space for the calculation by the CPU 10b, and the data sent from respective parts of the vehicle and the control signals to be sent to respective parts of the vehicle are temporarily stored.

Various signals such as sensor outputs sent to the ECU 10 are passed to the input interface 10a and subjected to an analog-digital conversion. The CPU 10b processes a converted digital signal according to the program stored in the memory 10c to produce control signals. The output interface 10d sends these control signals to respective parts of the vehicle.

The engine 12 is, for example, a four-cycle (four-stroke), four-cylinder engine and one of the cylinders is schematically shown in the figure. The engine 12 is connected to an intake pipe 16 via an intake valve 14, and to an exhaust pipe 20 via an exhaust valve 18. A fuel injection valve 22 for injecting fuel according to the control signal from the ECU 10 is provided in the intake pipe 16. Alternatively, the fuel injection valve 22 may be provided in the combustion chamber 24.

The engine 12 introduces into the combustion chamber 24 gaseous mixture of the air sucked through the intake pipe 16 and the fuel injected from the fuel injection valve 22. The combustion chamber 24 is provided with an ignition plug 26 for generating sparks according to the ignition timing signal from the ECU 10. The sparks from the ignition plug 26 cause the gaseous mixture to burn. Through this burning, the volume of the gaseous mixture increases thereby pushing down the piston 28 downward. The reciprocating motion of the piston 28 is converted to the rotation of the crank shaft 30. In the case of a four cycle engine, the engine cycle consists of an intake, compression, combustion, and exhaust strokes. The piston 28 reciprocates twice for each cycle.

The internal pressure sensor 29 is embedded in a portion of the ignition plug 26 in contact with the cylinder. Alternatively, when the fuel injection valve 22 is provided in the combustion chamber 24, the internal pressure sensor 29 may be embedded in a portion of the fuel injection valve 22 in contact with the cylinder. The internal pressure sensor 29 generates a signal in response to the change rate of the internal pressure in the combustion chamber 24 and sends this signal to the ECU 10.

Figure 2:
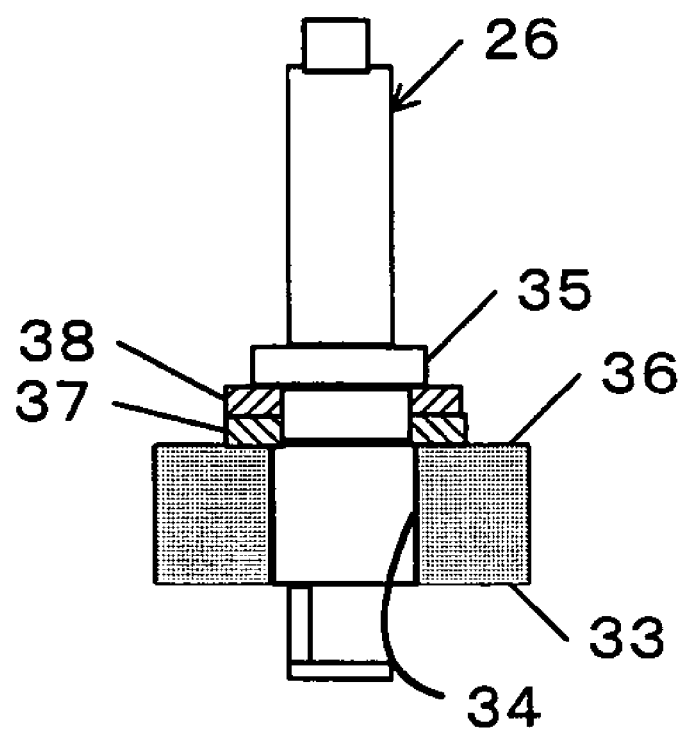
FIG. 2 illustrates one example of the mounting of an internal pressure sensor.

FIG. 2 illustrates one example of mounting of the internal pressure sensor 29. The ignition plug 26 is screwed into a screw hole 34 in the cylinder head 33. The sensor element portion 37 of the internal pressure sensor is inserted along with a washer 38 between the mounting seat 35 of the ignition plug 26 to the cylinder head 33 and the ignition plug seat-metal portion 36. The sensor element portion 37 is comprised of a piezoelectric element.

Since the sensor element portion 37 is compressed as an ignition plug seat-metal, and thus, is given a predetermined compressing load (initial load). When the pressure inside the combustion chamber 24 changes, the load applied to the sensor element portion 37 will change. The internal pressure sensor 29 detects the change of the applied load relative to the predetermined compressing load as the change of the internal pressure. The internal pressure is determined by integrating the change of the internal pressure.

Referring back to FIG. 1 again, the engine 12 is provided with a crank angle sensor 32 for detecting the rotation angle of the crank shaft 30. The crank angle sensor 32 outputs a CRK signal and a TDC signal which are pulse signals to the ECU 10, in association with the rotation of the crank shaft 30.

The CRK signal is a pulse signal outputted at a predetermined crank shaft angle (for example, at every 30 degrees). The TDC signal is a pulse signal outputted at a crank shaft angle associated with the TDC position (top dead center) of the piston 28 (for example, at every 180 degrees). These pulse signals are used for various timing control for operating the engine, such as the fuel injection time and the ignition time. Particularly, in this embodiment, the CRK signal is used for the derivation of the seating time of the intake valve 14 of each cylinder.

The continuously variable valve timing and lift control system 40 is a mechanism capable of continuously changing the lift amount and the open/close timing of the intake valve 14. In the present embodiment, the continuously variable valve timing and lift control system 40 is comprised of a variable valve lift control system 42 and a variable valve phase control system 44.

Figure 3:
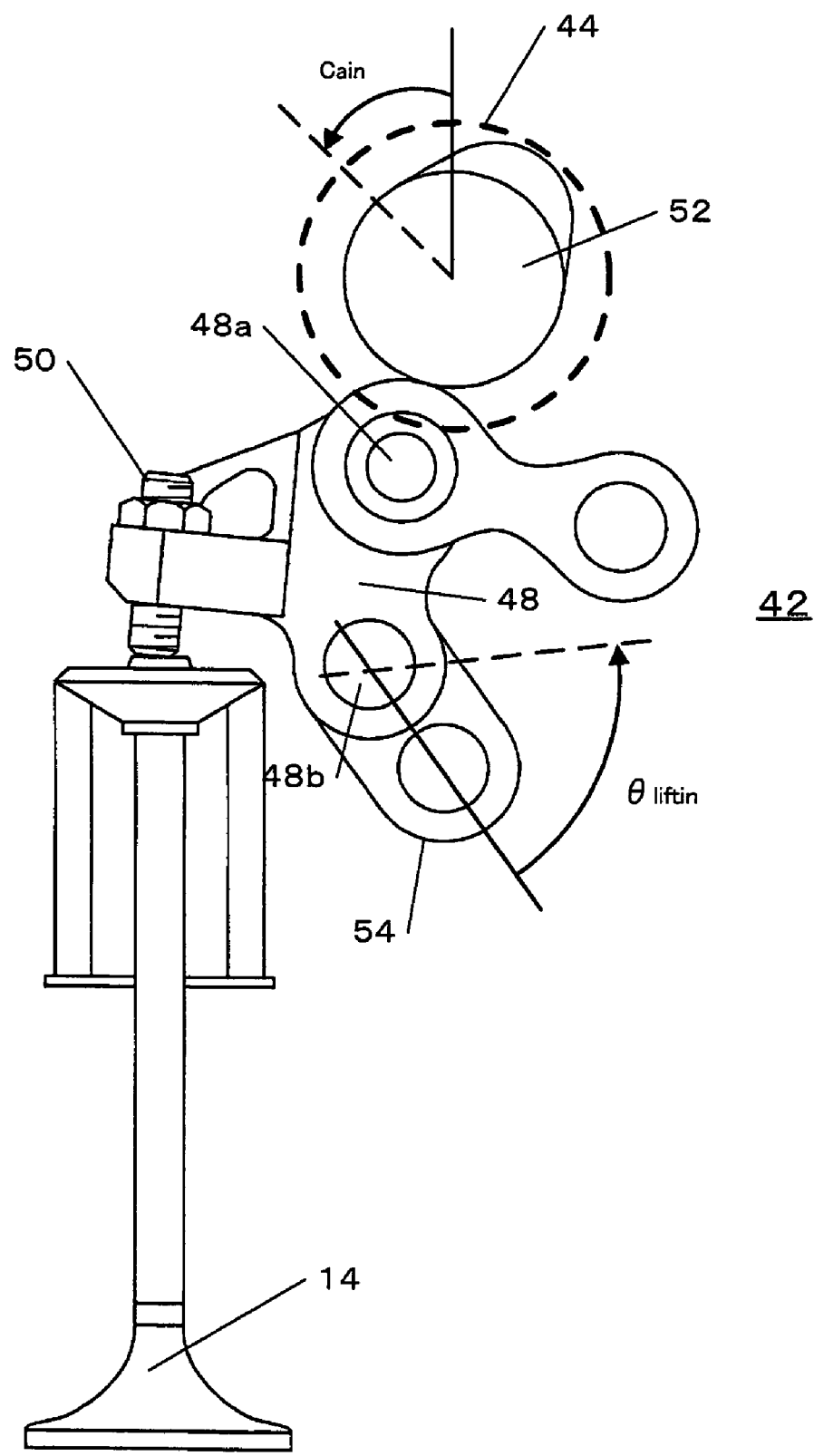
FIG. 3 is a schematic diagram of a continuously variable valve timing and lift control system.

The variable valve lift control system 42 continuously changes the lift amount of the intake valve 14 according to the control signal from the ECU 10. FIG. 3 is a schematic diagram to show the variable valve lift control system 42 used in the present embodiment. This variable valve lift control system 42 continuously changes the lift amount of the intake valve using a four-bar linkage. Moreover, as the lift amount changes, the timing for closing the valve changes toward the advance angle side when the lift amount is small, and to the retard angle side when the lift amount is large.

Referring to FIG. 3, the variable valve lift control system 42 is configured such that one link 48 of the four-bar linkage is integrated with an adjust screw 50 for pushing down the valve and such that a cam 52 pushed down a joint part 48a at an end of the link 48 thereby driving the valve 14. At this time, a link 54 (hereinafter referred to as a control link) connected to the other end 48b of the link 48 is rotated around the joint part 48b by a driving means such as an electric motor and a hydraulic mechanism to change the lift amount of the valve 14 continuously from a suspended state to a maximum lift state.

For example, as shown in FIG. 3, when an angle θliftin, (hereafter referred to as an operating angle) formed by the control link 54 is set, the lift amount of the valve 14 becomes smaller when the operating angle θliftin is small and becomes larger when the operating angle θliftin is large.

This variable valve lift control system 42 is configured such that an operating angle sensor 46 for detecting operating angle θliftin is placed in the joint portion 48b. The lift amount liftin of the intake valve 14 is controlled by controlling operating angle θliftin so as to converge to a target operating angle corresponding to a requested lift amount liftinCMD specified by the ECU 10.

The variable valve phase control system 44 continuously changes the open/close timing of the intake valve 14 according to a control signal from the ECU 10. In this embodiment, the variable valve phase control system 44 is configured such that a vane-type actuator (not shown) is incorporated at an end of the cam 52 in FIG. 3 so that the advance angle Cain of the intake valve 14 can be changed toward the advance angle side or the retard angle side through hydraulic control.

The variable valve phase control system 44 is placed with an advance angle sensor 47 for detecting the advance angle Cain and controls the phase angle Cain of the cam 52 through hydraulic control according to a requested phase angle, CainCMD, specified by the ECU 10.

Figure 4:
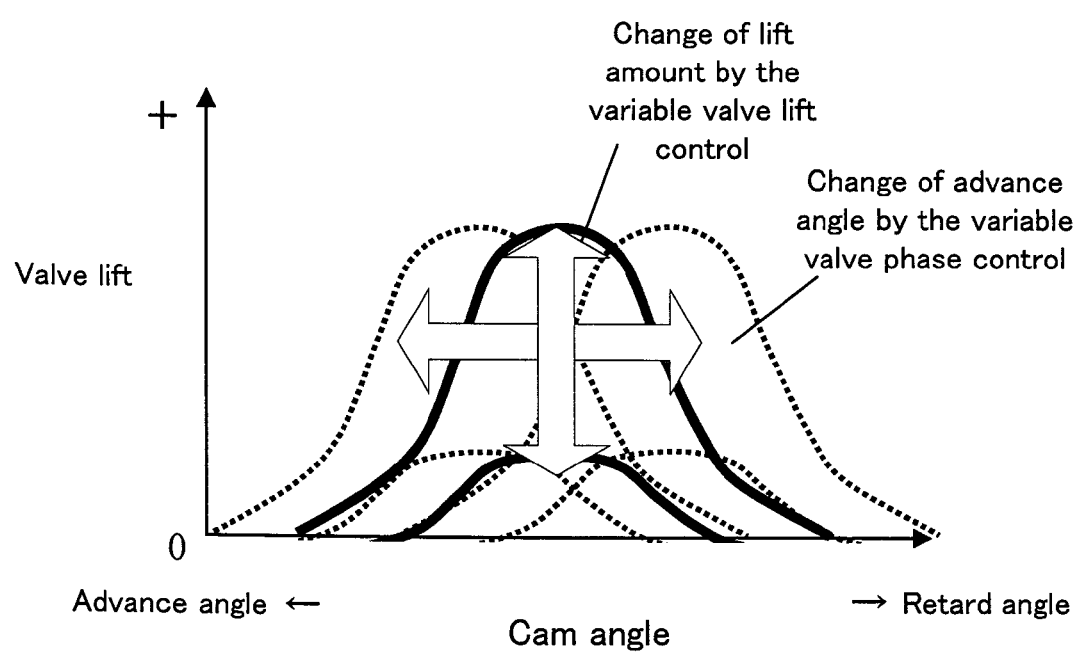
FIG. 4 is a graph to show the behavior of an intake valve according to a continuously variable valve timing and lift control system.

FIG. 4 is a graph to show the behavior of the intake valve 14 according to the continuous variable valve timing and lift control system 40. The horizontal axis of the graph represents the angle of the cam 52, the direction toward the origin point indicates the advance angle side, the other direction the retard angle side. Since the cam 52 is driven in association with the crank axis, the horizontal axis of FIG. 4 is the equivalent with crank angle. The vertical axis of the graph represents the lift amount.

The variable valve lift control system 42 can continuously change the lift amount of the intake valve 14. This function is represented as a continuous change in the direction of the vertical axis in the graph of FIG. 4. Since the phase of the cam 52 continuously changes toward the advance side or the retard side through the variable valve phase control system 44, the open/close timing of the intake valve 14 can be continuously changed toward the advance side or the retard side. This function is represented as a continuous change in the direction of the horizontal axis in the graph of FIG. 4. Thus, the continuously variable valve timing and lift control system 42 can continuously change the lift amount and the open/close timing of the intake valve 14.

Moreover, the above described variable valve lift control system 42 and the variable valve phase control system 44 may be used so as to change the lift amount or the advance angle of the exhaust valve 16. Further, the variable valve lift control system 42 and the variable valve phase control system 44 may be integrally configured.

Figure 5:
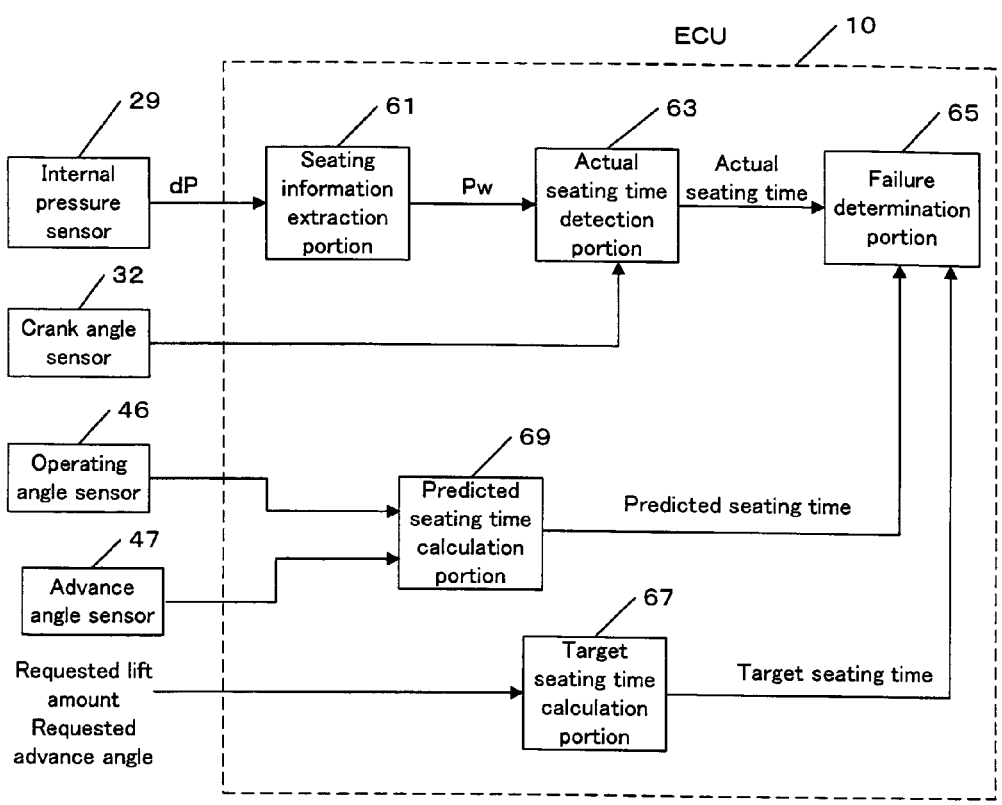
FIG. 5 is a block diagram of a failure detection apparatus for a continuously variable valve timing and lift control system according to one embodiment of the present invention.

Next, referring to FIG. 5, a failure detection apparatus for a continuously variable valve timing and lift control system according to an embodiment of the present invention will be described. In this embodiment, an actual seating time VclsANG of the intake valve 14 of each cylinder is detected based on the output signal of the internal pressure sensor 29. The detected actual seating time VclsANG is corrected for a stationary deviation in sensor outputs due to degradation over time or unevenness to remove noise components therefrom, and thereafter the deviation with respect to the target seating time is obtained. This deviation is used to perform failure detection for the continuously variable timing and lift control system. FIG. 5 is a block diagram of a failure detection apparatus of a continuously variable valve timing and lift control system.

Figure 6:
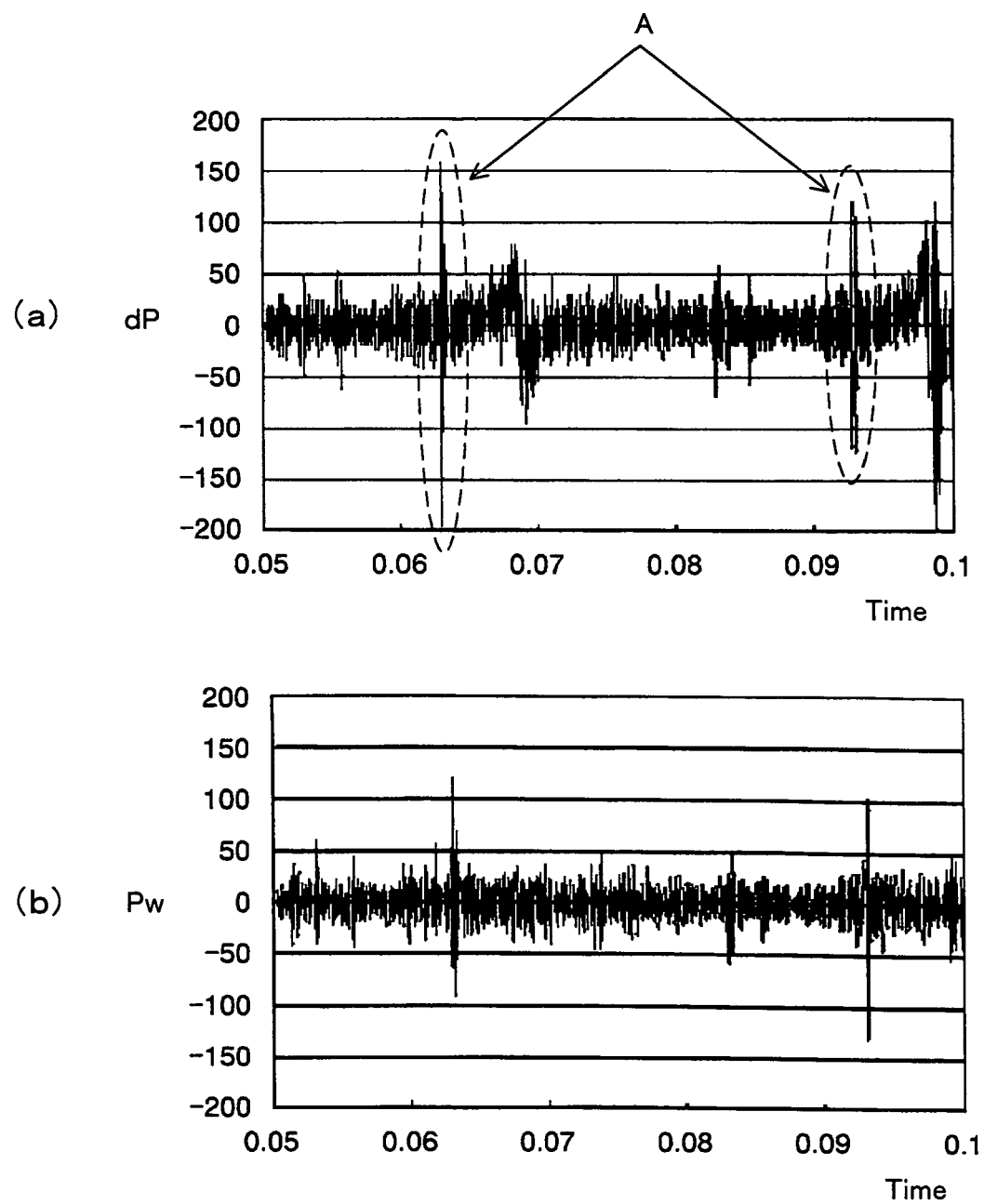
FIG. 6 illustrates the output signal of an internal pressure sensor and the seating signal extracted from this output signal.

The internal pressure sensor 29 outputs a differential value representing variation of the internal pressure. It is known that the output signal of the internal pressure sensor 29 includes an internal pressure component (of about 0 to 1 kHz), a knocking component (of about 6 to 10 kHz), and seating noise of the intake/exhaust valves (of mostly high frequencies). FIG. 6(a) shows the output signal dP of the internal pressure sensor 29 measured at the conditions of a sampling frequency of 96 kHz, an engine revolutionary speed of 4000 rpm, and a full open throttle. In the output signal dP, the part indicated by symbol A represents the seating noise of the intake valve 14.

A seating information extraction portion 61 extracts a component Pw associated with seating noise from output signal dP of the internal pressure sensor 29. In this embodiment, a wavelet transformation capable of sequential frequency separation is used to extract seating noise. Since the wavelet transformation is a well known technique, detailed description is omitted here.

The wavelet transformation resolves the frequency dividing the sampling frequency into halves. In the present embodiment, since the sampling frequency of the output signal dP of the internal pressure sensor 29 is 96 kHz, the frequency bands which can be extracted by the wavelet transformation are 48 through 24 kHz, 24 through 12 kHz, 12 through 6 kHz (including knocking frequencies), and lower frequency (including internal pressure components). In the present embodiment, considering a secondary frequency of knocking (16 kHz), a frequency band of 48 to 24 kHz is used for the seating signal Pw which is the component associated with the seating noise. FIG. 6(b) shows the seating signal Pw extracted by the wavelet transformation. In comparison with FIG. 6(a), it is seen that lower frequency components are removed.

Alternatively, as the technique to extract seating noise in the seating information extraction portion 61, other techniques such as a correlation filter and a short period FPT may be used.

The actual seating time detection portion 63 detects an actual seating time VclsANG of respective cylinders (for example of four cylinders) from the seating signal Pw. Since seating signals Pw#1 to Pw#4 such as shown in FIG. 6(b) are inputted for each cylinder, the angle of the crank 30 at which the seating signal exceeds a predetermined threshold is latched as the actual seating time VclsANG#1 to #4(deg) for the intake valve of the cylinder concerned. The detected actual seating time is sent to a failure determination portion 65.

Figure 7:
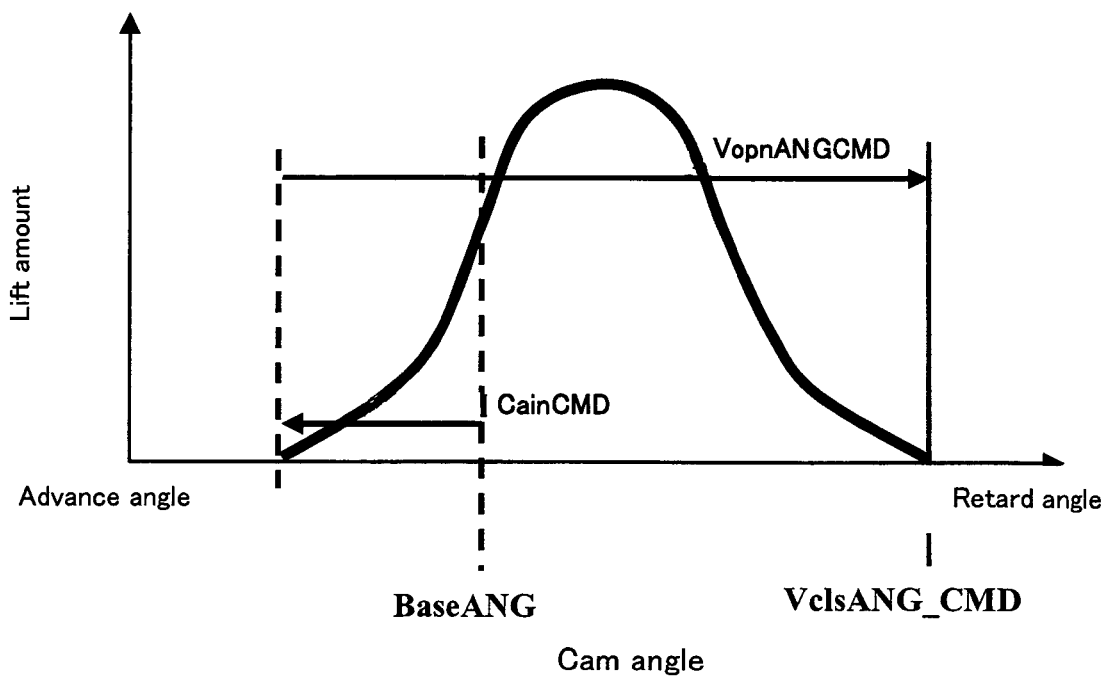
FIG. 7 illustrates variables used in the derivation of the target seating time.
Figure 8:
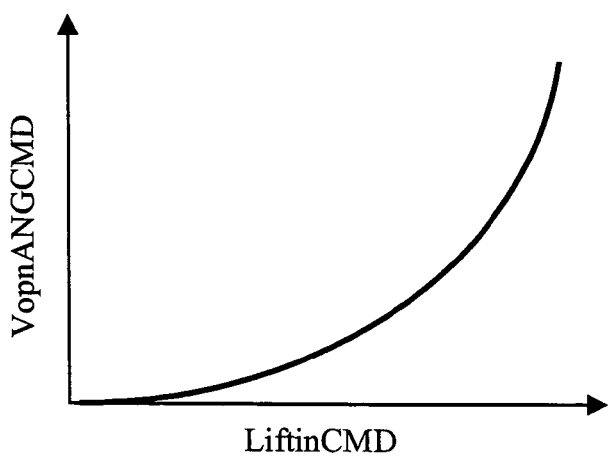
FIG. 8 is a transformation map for determining the range of cam angle in which the intake valve is open, from a requested lift amount.

The target seating time calculation portion 67 calculates a target seating time VclsANG_CMD from the requested lift amount LiftinCMD and the requested advance angle CainCMD, which are control inputs for the continuously variable valve timing and lift control system 42. FIG. 7 illustrates variables used in the derivation of the target seating time VclsANG_CMD. From the requested lift amount LiftinCMD, the range of the cam angle in which the intake valve 14 is opened VopenANGCMD (hereinafter referred to as "open angle") is determined using a transformation map as shown in FIG. 8. Further, from a predetermined valve-open-start angle BaseANG (set for each cylinder), and a requested advance angle CainCMD, a current valve-open-start angle for each cylinder is calculated. Then, this angle and the open angle VopenANGCMD are added together to calculate a target seating time VclsANG_CMD for each cylinder. The target seating time VclsANG_CMD is calculated according to equation (1) below.

$$VclsANG\_CMD = (BaseANG \cdot CainCMD) + VopenANGCMD \quad (1)$$

The calculated target seating time VclsANG_CMD is sent to the failure determination portion 65.

Figure 9:
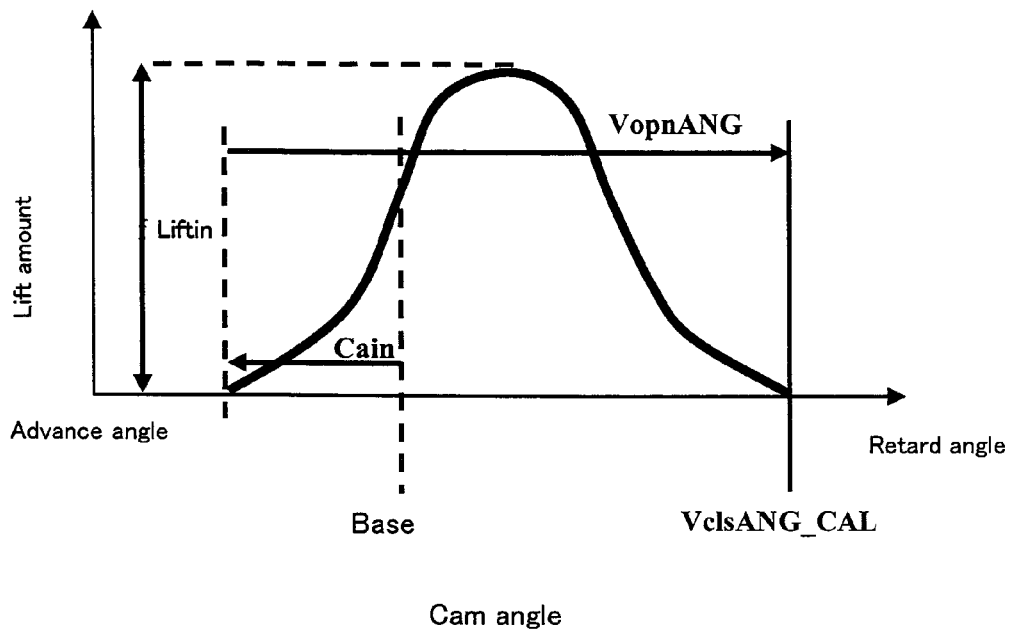
FIG. 9 illustrates respective variables used for the derivation of a predicted seating time.
Figure 10:
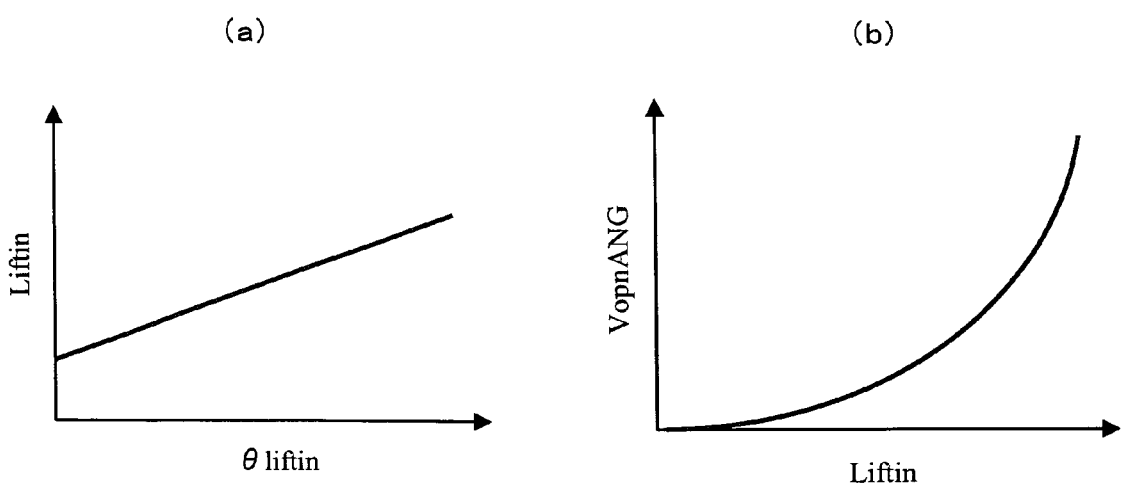
FIG. 10 is a transformation map for determining the actual lift amount from the operating angle of a control link and a transformation map for determining the range of cam angle in which the intake valve is open, from the actual lift amount.

The predicted seating time calculation portion 69 calculates a predicted seating time VclsANG_CAL from an operating angle θlinfin for adjusting the lift amount of the continuously variable valve lift and timing control system 42. FIG. 9 illustrates respective variables for use in the derivation of the predicted seating time VclsANG_CAL. From an operating angle θlinfin of the control link which is measured by the operating angle sensor 46, an actual lift amount liftin is determined using a transformation map as shown in FIG. 10(*a*) and further, from this actual lift amount, liftin, an open angle VopenANG is determined using a transformation map as shown in FIG. 10(*b*). Further, from a predetermined valve open-start angle, Base, and an actual advance angle Cain of the variable valve phase control system, a current valve-open-start angle is calculated. Then, by adding this angle and the open angle VopenANG, a predicted seating time VclsANG_CAL is calculated. The predicted seating time VclsANG_CAL is calculated by equation (2) below:

$$VclsANG\_CAL = (Base \cdot Cain) + VopenANG \quad (2)$$

The predicted seating time VclsANG_CAL thus calculated is sent to the failure determination portion 65.

Moreover, the target seating time VclsANG_CMD corresponding to the predicted seating time VclsANG_CAL is calculated by replacing BaseANG with Base in equation (1).

Figure 11:
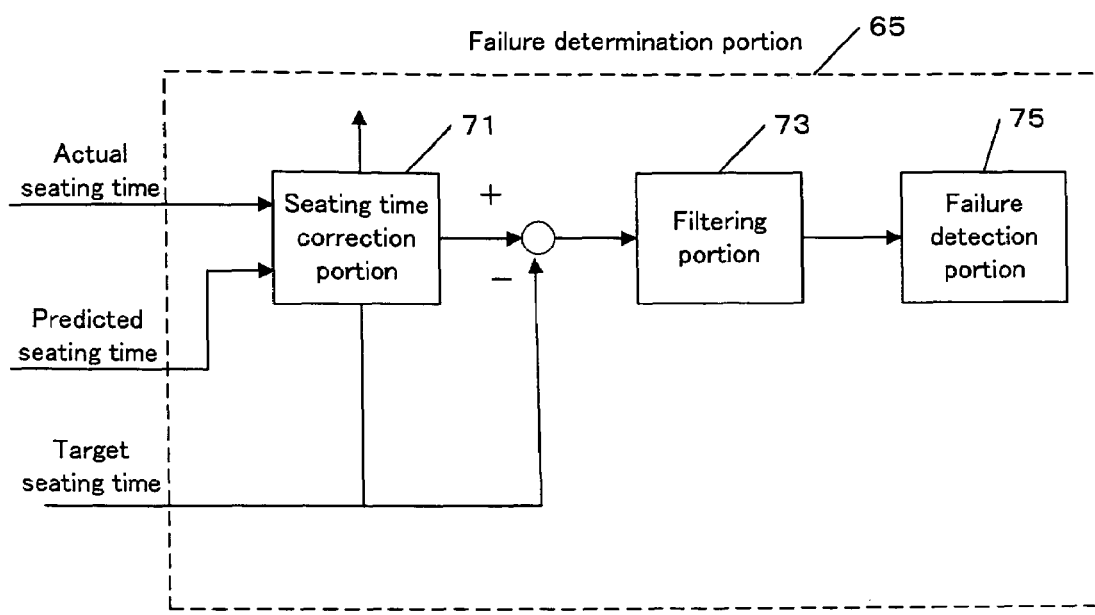
FIG. 11 is a block diagram to show the details of a failure determination portion.

The failure determination portion 65 determines a failure of the continuously variable valve timing and lift control system by comparing the actual seating time VclsANG#1 to #4 and the predicted seating time VclsANG_CAL for each cylinder with the target seating time VclsANG_CMD corresponding thereto respectively. FIG. 11 is a block diagram to show the details of the failure determination portion 65. Now, a description will be made along this block diagram.

A seating time correction portion 71 corrects for a stationary deviation which may result from a degradation of the sensor or a variation in the detection result, by multiplying the actual seating time VclsANG#1 to #4 and the predicted seating time VclsANG_CAL for each cylinder by a gain. This correction is performed using equation (3) with the inputted seating times (actual seating time and predicted seating time for each cylinder) as VclsANG:

$$VclsANG\_Adj = Gain \times VclsANG \quad (3)$$

where, VclsANG_Adj is a corrected seating time. VclsANG represents an inputted seating time (either actual seating time VclsANG#1 to #4 or predicted seating time VclsANG_CAL for each cylinder), and Gain represents a gain for correction for the seating time concerned.

The seating time correction portion 71 sends the corrected seating time VclsANG_Adj calculated by equation (3) to a filtering portion 73 and adjusts the gain Gain such that the stationary deviation between VclsANG_Adj and the target seating time VclsANG_CMD will be eliminated. In the present embodiment, the gain is adjusted based on a successive least squares method as shown below.

First, a deviation e_id between a seating time after correction VclsANG_Adj and a target seating time VclsANG_CMD corresponding thereto are determined.

$$e\_id = VclsANG\_CMD \cdot VclsANG\_Adj \quad (4)$$

Using this deviation e_id, a new gain Gain is calculated through equation (5):

$$Gain = Gbase + ICP \times \Sigma(e\_id) \quad (5)$$

where, Gbase is a reference value for the gain and ICP is an updating factor of a least squares method.

Moreover, as a technique to adjust the correction gain in the seating time correction portion 71, other identification techniques may be used instead of the successive least squares method.

For actual seating times VclsANG_Adj#1 to #4 and predicted seating time VclsANG_CAL_Adj for which the stationary deviation is corrected in the seating time correction portion 71, deviations Err#1 to #4 and Err_cal from the respective corresponding target seating time VclsANG_CMD are calculated and inputted to the filtering portion 73.

A filtering portion 73 removes high frequency components such as noise included in deviations Err#1 to #4 and Err_cal using a smoothing filter such as a moving average method, a median filter, and a low-pass filter. By performing such filtering, it is made possible to prevent erroneous detections due to a sporadic noise.

A failure detection portion 75 performs failure detection of the continuously variable valve timing and lift control system based on the deviations Err:#1 to #4 and Err_cal. Each of the deviations Err#1 to #4 and Err_cal is compared with a respective predetermined threshold, and a determination is made such that a cylinder or an operating angle sensor of which deviation is larger than a threshold is a failure site.

For example, when any of deviations Err #1 to #4 of the actual seating time of the cylinders #1 to #4 exceeds a threshold, the failure detection portion 75 makes a determination that the inlet valve or the internal pressure sensor 29 of the cylinder concerned is in failure. Moreover, when the deviation of the predicted seating time, Err_cal, exceeds a threshold, the failure detection portion 75 makes a determination that the operating angle sensor 46 or the advance angle sensor 47 placed in the variable valve timing and lift control system is in failure. Further, when all the deviations Err #1 to #4 and Err_cal exceed a threshold, the failure detection portion 75 makes a determination that the continuously variable valve timing and lift control system 40 is in failure.

Alternatively, the failure detection portion 75 may be configured such that a determination of a failure is made after elapse of a predetermined period of time in a state in which each of the deviations Err #1 to #4 and Err_cal exceeds a predetermined threshold. By doing so, an erroneous detection due to a sporadic noise can be prevented.

So far, although embodiments of the present invention have been described, the present invention will not be limited to those embodiments. In the above described embodiments, although description was made on an apparatus for detecting a failure of a continuous variable valve timing and lift control system 40 in which the lift amount or the open/close timing of the intake valve 14 is continuously changed, such failure detection apparatus can also be applied to a conventional variable valve timing and lift control system in which the lift amount or the open/close timing is changed in a step-wise manner.

Further, although, in the above described embodiments, a variable valve lift control system 42 in which the timing of closing the valve is changed in association with the change in the lift amount is applied, alternatively, a variable valve lift control system in which the lift amount is changed without changing the open/close timing of the valve may be applied.

Further, a failure detection apparatus according to the present invention can be applied to an electromagnetic valve in which the advance angle and open angle are continuously changed. The electromagnetic valve switches its open and close states by alternately applying power to a pair of opposing electromagnets. By adjusting the timing of switching the conducted electromagnets, an electromagnetic valve can be freely controlled in terms of the timing for opening the valve (advance angle) and the period of time in which the valve is opened (open angle). Moreover, details of electromagnetic valves are described in, for example, Japanese Patent Application Publication No. 2002-147260.

Furthermore, although, in the above described embodiments, an internal pressure sensor 29 was used as the means for extracting the component of seating sound of the valve, alternatively, means such as a vibration sensor capable of detecting signals containing the seating sound of the valve may be used.

What is claimed is:

1. A failure detection apparatus for detecting failures of a variable valve timing and lift control system in an internal combustion engine, said variable valve timing and lift control system adapted to switch opening/closing timing or lift amount of a valve depending on operating conditions, said apparatus comprising:
   a sensor for sensing a vibration inside a cylinder;
   means for extracting a component of seating sound of the valve from the output signal of said sensor;
   means for determining an actual seating time of the valve from said component of seating sound;
   means for calculating a target seating time of the valve-based on at least one of requested lift amount, requested advance angle, and requested open angle of the valve which are determined depending on operating conditions;
   means for correcting the actual seating time according to stationary deviation between the actual seating time and the target seating time, said stationary deviation caused by degradation or unevenness of the sensor; and
   means for comparing the corrected actual seating time with the target seating time to determine a failure of the variable valve timing and lift control system.

2. The failure detection apparatus according to claim 1, wherein said variable valve timing and limit control system comprises at least one of a variable valve lift control system capable of continuously changing the lift amount and a variable valve phase control system capable of continuously changing the advance angle.

3. The failure detection apparatus according to claim 1, wherein said variable valve timing and limit control system is an electromagnetic valve capable of continuously changing the advance angle and open angle thereof.

4. The failure detection apparatus according to claim 1, wherein said sensor is an internal pressure sensor provided in each cylinder.

5. The failure detection apparatus according to claim 4, wherein the output signal of the sensor is a differential value of the internal pressure of the cylinder.

6. The failure detection apparatus according to claim 1, further comprising means for calculating a predicted seating time from the detection signal of an operating angle sensor placed in said continuously variable valve timing and lift control system, wherein said correction means further corrects the predicted seating time in response to a stationary deviation between the predicted seating time and the target seating time, and said failure determination means further compares the corrected predicted seating time with the target seating time to determine a failure of said variable valve timing and lift control system.

7. The failure detection apparatus according to claim 1, further comprising means for filtering the deviation so as to remove high frequencies of the deviation between said corrected actual seating time or predicted seating time and the target seating time, wherein said failure determination means determines failure of said variable valve timing and lift control system based on the deviation.

8. The failure detection apparatus according to claim 1, wherein said failure determination means determines failure of said variable valve timing and lift control system when the deviation between the corrected actual seating time or predicted seating time and the target seating time exceeds a predetermined value for a predetermined period of time.

9. A method of detecting failures of a variable valve timing and lift control system in an internal combustion engine, said variable valve timing and lift control system adapted to switch opening/closing timing or lift amount of a valve depending on operating conditions, said method comprising the steps of:
   sensing a vibration inside a cylinder with a sensor;
   extracting a component of seating sound of the valve from the output signal of the sensor;
   determining an actual seating time of the valve from said component of seating sound;
   calculating a target seating time of the valve based on at least one of requested lift amount, requested advance angle, and requested open angle of the valve which are determined depending on operating conditions;
   correcting the actual seating time according to stationary deviation between the actual seating time and the target seating time, said stationary deviation caused by degradation or unevenness of the sensor; and
   comparing the corrected actual seating time with the target seating time to determine a failure of the variable valve timing and lift control system.

10. The method according to claim 9, wherein said variable valve timing and limit control system comprises at least one of a variable valve lift control system capable of continuously changing the lift amount and a variable valve phase control system capable of continuously changing the advance angle.

11. The method according to claim 9, wherein said variable valve timing and limit control system is an electromagnetic valve capable of continuously changing the advance angle and open angle thereof.

12. The method according to claim 9, wherein said sensor is an internal pressure sensor provided in each cylinder.

13. The method according to claim 12, wherein the output signal of the sensor is a differential value of the internal pressure of the cylinder.

14. The method according to claim 9, further comprising the steps of calculating a predicted seating time from the detection signal of an operating angle sensor placed in said continuously variable valve timing and lift control system, correcting the predicted seating time in response to a stationary deviation between the predicted seating time and the target seating time, and comparing the corrected predicted seating time with the target seating time to determine a failure of said variable valve timing and lift control system.

15. The method according to claim 9, further comprising the steps of filtering the deviation so as to remove high frequencies of the deviation between said corrected actual seating time or predicted seating time and the target seating time, wherein said failure determination means determines failure of said variable valve timing and lift control system based on the deviation.

16. The method according to claim 1, wherein said determining step determines failure of said variable valve timing and lift control system when the deviation between the corrected actual seating time or predicted seating time and the target seating time exceeds a predetermined value for a predetermined period of time.

\* \* \* \* \*